Sept. 29, 1964     R. B. JOHNSON ETAL     3,150,570
PISTON
Filed May 14, 1963     3 Sheets-Sheet 1
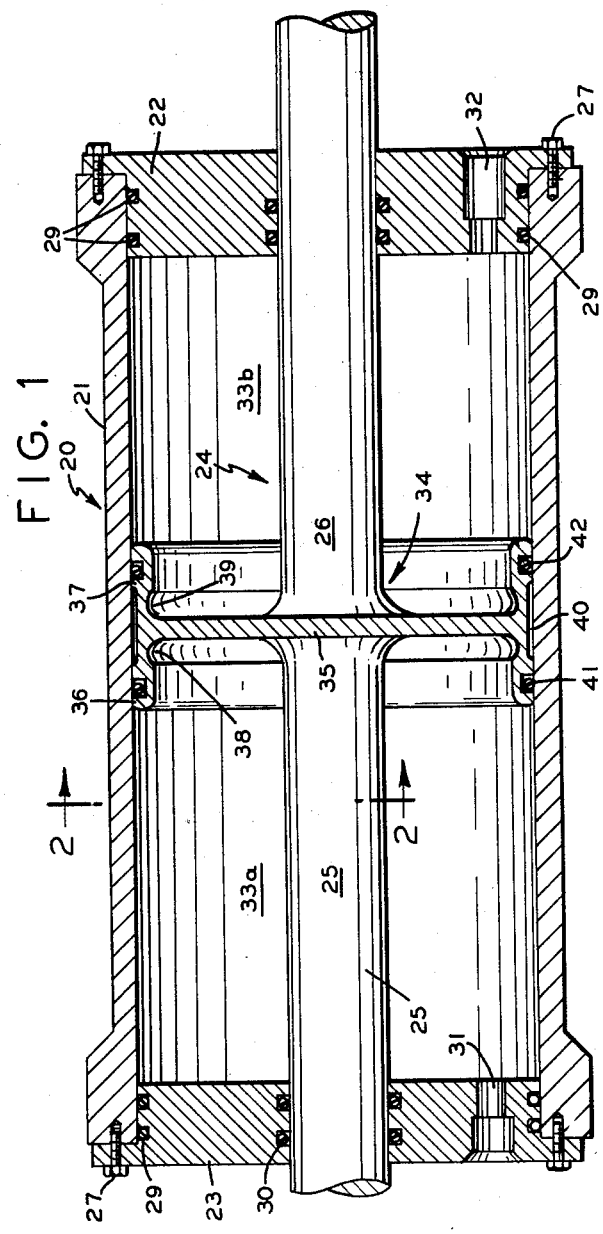
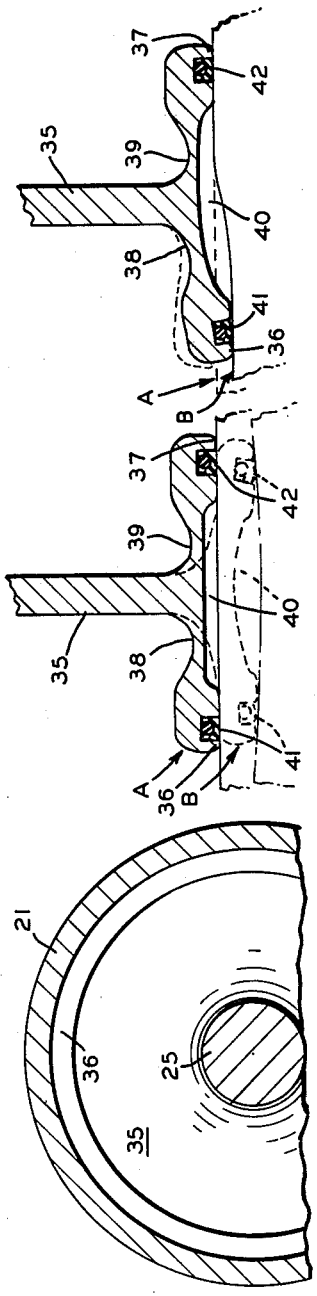
ROY B. JOHNSON
JOSEPH E. SCERBO
STEVEN M. BRICKMAN
INVENTORS.
BY *Arthur J. Plantamura*
ATTORNEY.

Sept. 29, 1964     R. B. JOHNSON ETAL     3,150,570
PISTON

Filed May 14, 1963     3 Sheets-Sheet 2

ROY B. JOHNSON
JOSEPH E. SCERBO
STEVEN M. BRICKMAN
        INVENTORS.

BY *Arthur J. Plantamura*
        ATTORNEY.

Sept. 29, 1964  R. B. JOHNSON ETAL  3,150,570
PISTON
Filed May 14, 1963  3 Sheets-Sheet 3
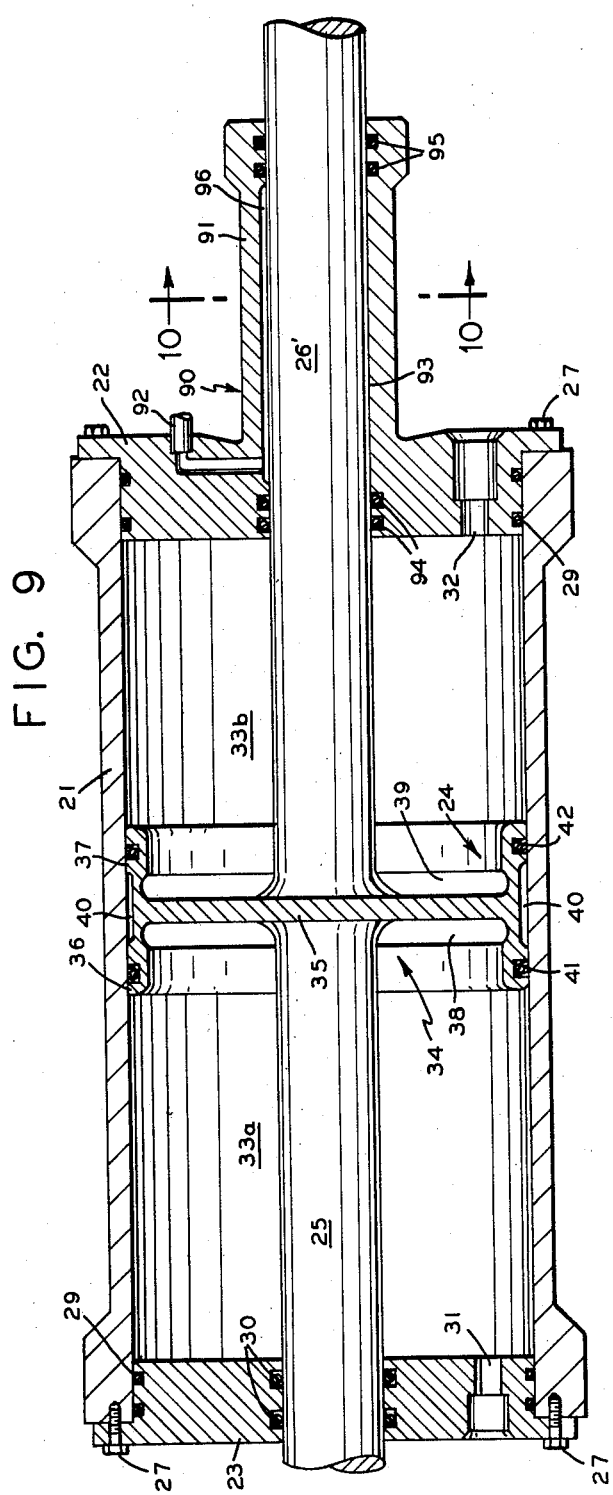
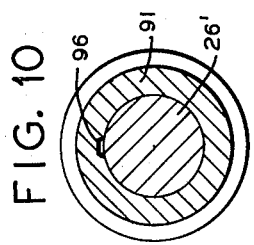
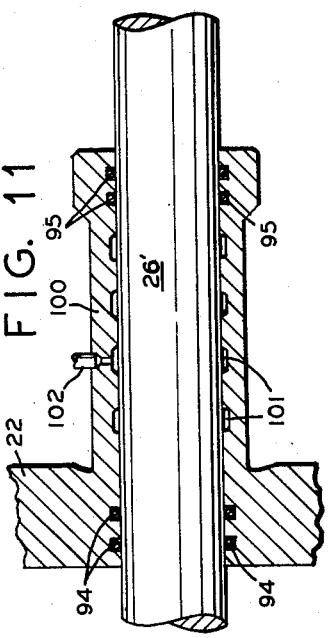
ROY B. JOHNSON
JOSEPH E. SCERBO
STEVEN M. BRICKMAN
INVENTORS.
BY
*Arthur J. Plantamura*
ATTORNEY.

# United States Patent Office 3,150,570
Patented Sept. 29, 1964

3,150,570
PISTON
Roy B. Johnson, Larchmont, N.Y., Joseph E. Scerbo, Stamford, Conn., and Steven M. Brickman, Mount Vernon, N.Y., assignors to American Machine & Foundry Company, a corporation of New Jersey
Filed May 14, 1963, Ser. No. 280,263
2 Claims. (Cl. 92—28)

This invention relates to a novel arrangement in piston-cylinder assemblies and more particularly, to a piston-cylinder assembly for actuators in which relatively light weight and thin walls in the cylinder structure are important considerations. Unless the cylinder wall of mechanisms operated by relatively high fluid pressures has substantial thickness, it becomes subject to expansion from fluid pressure introduced to operate the assembly. The invention is concerned with an assembly of this kind wherein the piston is so constructed as to enable it to expand to account for said expansion of the cylinder wall and substantially maintain a seal with the cylinder wall as the wall expands within its elastic limit.

In a particularly preferred embodiment, the invention relates to an assembly of this kind in combination with a piston construction which provides a releasable locking bearing between two members capable of being translated with respect to each other. In this latter arrangement, an arm or piston rod and a sleeve or bearing for the piston rod, are firmly interlocked by dimensioning the members so as to have an interference fit. The grip of the sleeve on the rod is relieved or unlocked at will by the introduction of a pressurized fluid at the interface between the piston rod and sleeve thereby uncoupling the bearing surface between the two and allowing relative movement of the members.

An important advantage of the combination of the invention which employs the interference fit on the piston rod resides in its fail-safe feature; when the pressure is relieved, the piston, due to the interference fit coupling on the piston rod, is locked preventing movement until pressure is reapplied. The interference interlock is described in detail in the copending application of B. Frassetto et al., Serial No. 280,355 entitled "Actuator," filed on even date herewith on May 14, 1963. Essentially that mechanism comprises a cylindrical rod within a sleeve, the latter having an internal diameter, which is less than the outer diameter of the rod over which it is placed in engagement. The sleeve is expandable radially when fluid pressure is applied. The expansion of the sleeve is held within the elastic limit of the material, and therefore does not introduce permanent deformation in the cylinder wall. The locking effect achieved between the sleeve and rod due to the interference fit is a combination of friction and molecular interaction of the materials. Hence, both the fritcion force and the molecular attraction forces provide the locking means at the bearing interface.

It is an object of the present invention to provide a piston-cylinder assembly, wherein the piston has an expandable periphery thereby allowing the piston to maintain a seal with the cylinder wall which is expanded under pressure within its elastic limit.

It is a further and more specific object of the invention to provide, in combination with an expandable piston of this kind, a comparatively high force releasable locking means for the piston rod which comprises an interference fit bearing lock.

It is a further object of the invention to provide an actuator mechanism employing an expandable piston-cylinder assembly which has infinite locking position capability for the piston rod or actuator arm and which employs fluid pressure to unlock the rod or arm thereby affording a fail-safe construction positively interlocking the rod or arm against further movement when pressure is relieved or fails.

Additional objects and advantages will appear hereinafter from the detailed description of the invention and from the disclosure set forth by the drawing wherein:

FIG. 1 is a side elevation view partially in section of one form of an expandable piston assembly.

FIG. 2 is an end view taken substantially along line 2—2 of FIG. 1.

FIG. 3 is a detailed enlarged view of a portion of the piston and cylinder wall adjacent thereto demonstrating the reaction of the elements under pressure.

FIG. 4 is a view similar to that of FIG. 3 illustrating the piston and wall reaction when subjected to uneven pressures on the opposite sides of the piston.

FIG. 9 is a side elevational view partially in section of an actuator mechanism which comprises in combination an expandable piston cylinder assembly and an interference fit bearing lock arrangement for the piston rod.

FIG. 10 is an end view of the interference bearing lock arrangement taken substantially along line 10—10 of FIG. 9.

FIG. 11 is a partial view of a bearing lock arrangement alternate to that shown in FIG. 9.

Figure 5:
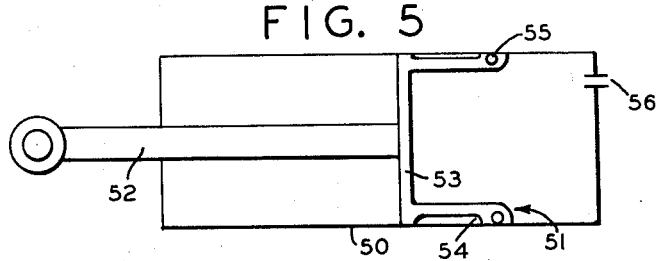
FIGS. 5, 6, 7 and 8 illustrate alternate piston configurations in accordance with the invention.

Reference to the embodiment illustrated in FIG. 1, shows an expandable piston assembly 20 comprising a cylinder or barrel 21, and end caps or closure elements 22 and 23. Caps 22 and 23 are secured in any suitable manner to the barrel 21 as by bolts 27 to afford a substantially fluid confining condition and for this purpose may contain one or more appropriate static seals 29. It is apparent that various suitable alternate means, e.g. welding, threading, keying, tie-rods, etc., may be used to attach these cylinder end caps in lieu of the attachment shown.

In accordance with the invention, a piston assembly generally referred to as 24 and comprising the piston itself 34 and piston rod is operably positioned in the cylinder. The piston rod comprises a left hand portion 25 and right hand portion 26. The rod may be formed integrally with the piston or it may comprise separate segments attached in a suitable manner to the piston member 34 so that the piston and rod provide a substantially rigid entity. Piston 34 as shown in FIG. 1 comprises essentially a web portion 35 and an expandable annular skirt portion consisting of a left hand skirt or portion 36 and a right hand skirt or portion 37.

Portions 36 and 37 are optionally but preferably provided with intermediate neck portions 38 and 39, respectively, to enhance flexibility of the free end of the skirt. Alternately the skirt portions 36 and 37 may be uniform in cross section. The segment of the face of the piston which joins the expandable skirts 36 and 37 and which contacts the barrel 21 may have recessed portion 40 formed therein. The desirability or necessity of neck portions 38 and 39 and/or recesses 40 may depend on the dimensions of the piston or the composition of the material forming the piston or skirt or the properties desired in the piston annular skirt portions 36 and 37.

Dynamic seals 41 and 42 are located at the contacting face of skirts 36 and 37, respectively. Such seals while not indispensible are preferred and comprise configurations of suitable structural design and are formed of material of suitable durability such as polytetrafluoroethylene. It will be understood that the invention also contemplates an arrangement which omits seals 41 and 42. For example, a surface to surface seal may be provided by the arrangement itself as where the surface of the piston skirt comprises a bronze or polytetrafluoroethylene composition or where the face only which is in contact with the inner wall of the cylinder is so composed.

The movement of the piston is effected in any conventional manner. This may be by manual actuation or by introducing a pressurized fluid to either port 31 or 32 or, alternately, by other arrangements which are standard for actuators such as a jack screw.

Operation of the assembly of the expandable skirt will be more apparent by reference to FIGS. 3 and 4, in conjunction with FIG. 1 of the drawing. The invention contemplates the use of an assembly of substantially the lightest practical weight consistent with the pressures to which it is subjected including suitable safety factors. Accordingly, the lightest barrel or cylinder is contemplated taking into account the likelihood that the barrel may expand within the elastic limit of the material from which it is formed.

As fluid, such as hydraulic liquid, is introduced into the cylinder for example through port 31 into 33a, at sufficient pressure to move the resistance of a load at 26, the pressure increase has the effect of expanding barrel 21 radially within its elastic limit. While the expansion is slight, unless compensation for the resulting leakage of fluid around the piston is provided for, the consequential loss would render the actuator inoperative especially in critical applications such as aircraft. Skirts 36 and 37 under the force of pressure acting radially against the inner periphery of skirts 36 and 37 will expand skirts 36 and 37 to the extent which allows these skirts to conform with the expanded contour of the barrel 21 thereby maintaining a suitable seal between the skirt and barrel or sleeve 21. With pressure equal or nearly so in chambers 33a and 33b, the barrel 21 expands radially within its elastic limit in a substantially symmetrical contour as shown in an exaggerated manner in FIG. 3. As this expansion occurs in the wall, 21 by virtue of the pressure in the cylinder, this same pressure acting on the inner annular surface of the skirt correspondingly expands the skirt against the barrel. The result is substantially that shown wherein a seal is maintained against the cylinder wall. When the conditions are such that the pressure in one chamber, i.e. in 33a, is higher than in chamber 33b, the skirts will compensate accordingly as shown in FIG. 4. As shown, the side 36 of the skirt is expanded relatively more than skirt 37 due to the relatively greater pressure at 33a than 33b.

In the embodiment illustrated and described in conjunction with FIGS. 1–4, the piston-cylinder assembly comprises a piston of symmetrical configuration, i.e. equipped with an annular skirt on either side of the piston web 35 flanked by a piston rod on each side. In the schematic alternate arrangement of FIG. 5, the barrel or cylinder 50 contains a piston 51 and piston rod 52 operably positioned in the cylinder. The piston 51 comprises a web portion 53 and skirt portion 54 constructed so as to be radially expanded and to maintain seal with the wall of cylinder 50 as when actuator pressure is introduced at 56. A suitable seal is illustrated at 55.

Figure 6:
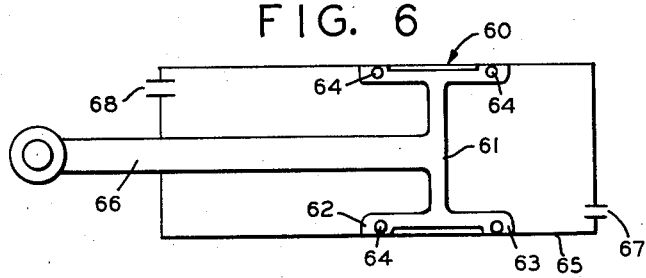

The embodiment of FIG. 6 comprises a piston 60 similar in configuration to that of FIG. 1. The piston 60 is positioned in cylinder 65. The piston 60 includes a web portion 61 and a left hand and a right hand skirt portions 62 and 63, respectively, which are substantially symmetrical configurations. Suitable seals are shown at 64. The arrangement differs from that of FIG. 1 in that a single rod 66 is employed in lieu of the double piston rod arrangement of FIG. 1. The piston is actuated by suitable fluid pressure means, such as by introducing hydraulic fluid at 67 while venting at 68 for one direction, and reversing the fluid pressurization for the opposite direction.

Figure 7:
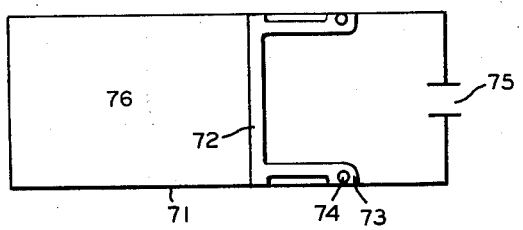
Figure 8:
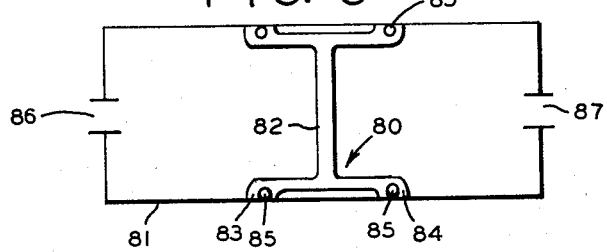

The embodiments of FIGS. 7 and 8 have pistons of configurations similar to those of FIGS. 5 and 6 respectively. The piston cylinder arrangement of FIGS. 7 and 8 are of the type known as "floating piston" assemblies. In FIG. 7, the piston 70 having substantial C-shaped cross-section is appropriately contained in the cylinder element 71. The piston comprises a web portion 72 and a skirt portion 73. A seal is designated at 74. The arrangement includes a pressure introduction port 75, e.g. for gas pressurization against a compressible fluid in the sealed chamber 76.

In the embodiment of FIG. 8, a piston 80 having a substantially I-shaped cross-section is disposed in the cylinder or barrel 81 and includes a web portion 82 and a left hand and a right hand skirt portions 83 and 84, respectively. Seals are designated at 85. Fluid ports 86 and 87 may be used alternately for pressure transfer.

Referring now to the embodiment of FIG. 9, the arrangement of the piston and barrel or cylinder arrangement comprises essentially that illustrated and described in FIG. 1. The embodiment of FIG. 9 differs from that of FIG. 1 in that it is equipped with a fail-safe interference fit bearing-lock arrangement in one of the piston rods. The same reference numerals are used to refer to parts in FIG. 9 which are similar to those like parts disclosed and described in FIG. 1. The bearing-lock arrangement referred to herein in conjunction with the expandable piston is described in greater detail in the mentioned application of B. Frassetto et al. filed on even date herewith.

In general, the interlock referred to as 90 in FIG. 9 comprises a barrel or bearing sleeve 91 machined so that its inner diameter is smaller than the outer diameter of the piston rod 26'. A suitable port shown at 92 is a pressurization port for delivery pressure to the interface 93 between the sleeve and piston rod. Preferably, dynamic seals, two sets which are shown, 94 and 95, are used to contain pressure introduced at the interface. A longitudinal groove 96 connected to the pressure port 92 may be employed to assure more rapid and uniform distribution of the fluid delivered at the interface of the bearing lock.

The arrangement of the bearing lock is such that in the absence of pressure, the bearing 93 is at rest in a locked position. The lock is effected by an interference fit between the bearing surface 91 and the outer surface of rod 26' which by mechanical engagement locks both members together. The quantum of force interlocking the surfaces of the members 26' and 91 is dependent on the extent of interference in this fit and on the configuration of the inner surface of the outer sleeve. In order to unlock this mechanical coupling, fluid under pressure is introduced to the bearing interface through port 92 employing sufficient pressure to effect a relative separation between these surfaces. This separation or unlocking allows rod 26' to move relatively freely through bearing assembly when force is exerted on the piston 24 by means of any conventional system such as one which is coordinated with pumping source and valving system for introducing and venting fluid under pressure at 31 and 32.

In the embodiment of FIG. 11, an alternate bearing-lock surface configuration is illustrated. Like reference numerals are employed in FIG. 11 for similar parts as shown in FIG. 9. The sleeve 100 in the embodiment of FIG. 11 differs from that in FIG. 9 in that it is provided with one or more annular grooves 101, four of which are shown. Fluid pressure release port 102 is shown positioned intermediate in the bearing surface 100 rather than in the end cap 22 as in FIG. 9. Various additional alternate configurations for the bearing interlock interface are described in the aforementioned application of B. Frassetto et al.

Additional variations may be made in detail by those skilled in the art without departing from the scope of the invention.

What is claimed is:

1. In combintion a closed pressurizable cylinder, a piston member operably positioned for reciprocating movement in said cylinder, said piston member comprising a rigid transverse web portion terminating at its periphery adjacent the inner wall of said cylinder with an integrally formed annular expandable skirt, said skirt being relatively flexible so that as the cylinder wall is expanded under pressure said pressure will correspondingly expand said skirt to conform to the contour of the expanded cylinder wall, a connecting rod for said piston extending through the end of the cylinder, a bearing for said rod, said bearing forming with said rod an interference fit bearing lock, a port for delivering pressurized fluid at the interface of said bearing lock to effect substantially the uncoupling of the lock of the interference fit, means for delivering fluid under pressure to said interference fit bearing lock interface, and means porting fluid pressure into said cylinder for reciprocating said piston when said interference fit lock is uncoupled.

2. In combination a closed pressurizable cylinder, a piston member operably positioned for reciprocating movement in said cylinder, said piston member comprising a rigid transverse web portion terminating at its periphery adjacent the inner wall of said cylinder in an expandable skirt and having a piston rod extending through said cylinder, said skirt being relatively flexible so that as the cylinder wall is expanded under pressure, said pressure will correspondingly expand said skirt radially to conform to the contour of the expanded cylinder wall, said rod being provided with a bearing which comprises an interference fit bearing lock between an annular segment of said piston rod and said bearing, said bearing lock being provided with a port for delivering pressurized fluid at the interface of said bearing lock to effect an unlocking of said interference fit, means for delivering fluid under pressure to the interface of said interference fit bearing lock, means for reciprocating said piston when said interference fit lock is released and means for introducing fluidized pressure into said cylinder for reciprocating said piston.

References Cited in the file of this patent

UNITED STATES PATENTS

| | | |
|---|---|---|
| 2,259,815 | Greve | Oct. 21, 1941 |
| 2,674,950 | Underwood | Apr. 13, 1954 |
| 2,873,579 | Safford | Feb. 17, 1958 |
| 2,992,052 | De John | July 11, 1961 |
| 3,132,569 | Shepherd | May 12, 1964 |

FOREIGN PATENTS

| | | |
|---|---|---|
| 509,458 | Belgium | Mar. 15, 1952 |